Dec. 2, 1930.  R. EHRENFELD  1,783,535
LUBRICATING DEVICE
Filed Jan. 5, 1929
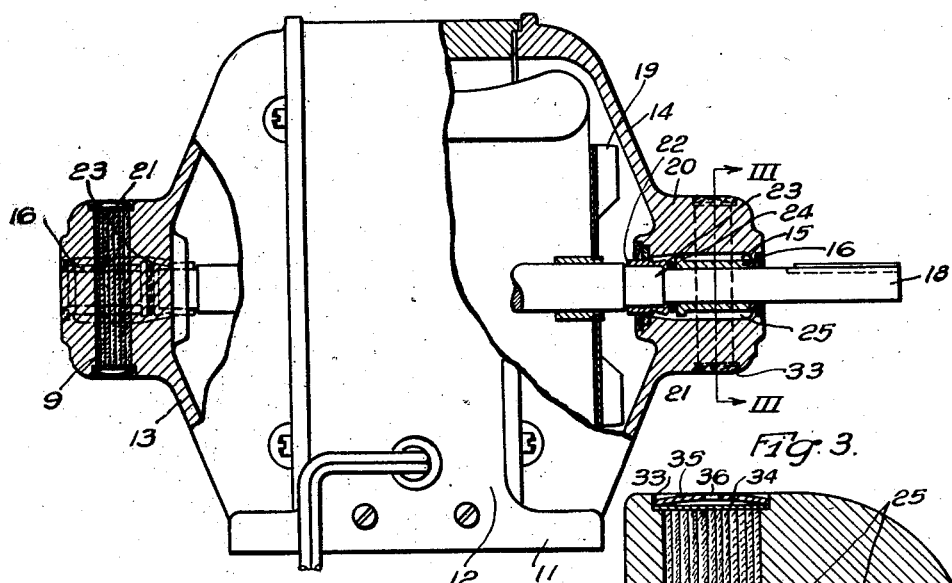
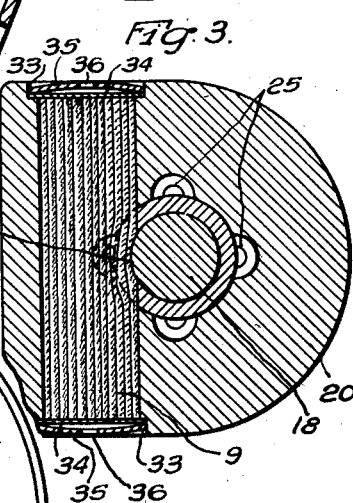
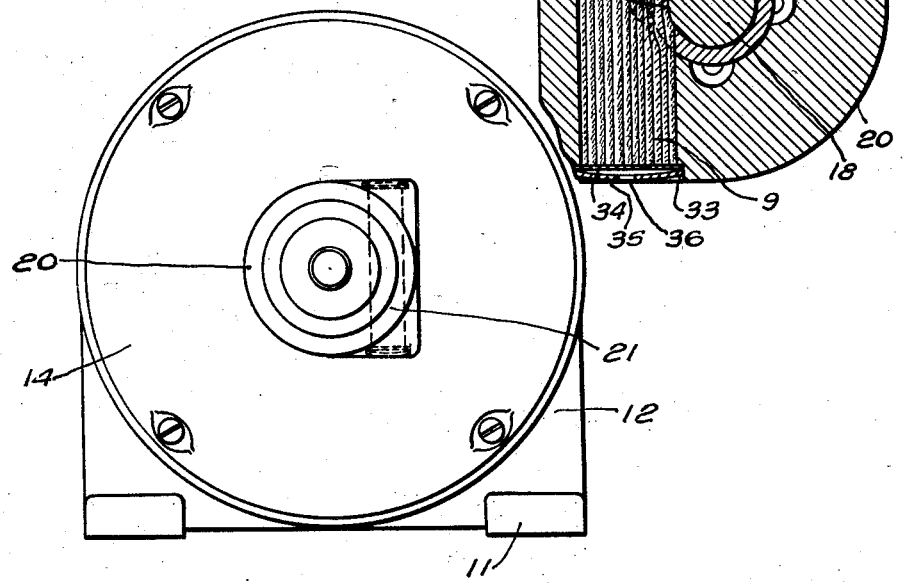
INVENTOR
Ralph Ehrenfeld.
BY
Wesley G. Carr
ATTORNEY Patented Dec. 2, 1930

1,783,535

UNITED STATES PATENT OFFICE

RALPH EHRENFELD, OF SPRINGFIELD, MASSACHUSETTS, ASSIGNOR TO WESTINGHOUSE ELECTRIC & MANUFACTURING COMPANY, A CORPORATION OF PENNSYLVANIA

LUBRICATING DEVICE

Application filed January 5, 1929. Serial No. 330,569.

My invention relates to shaft bearings and has particular relation to oiling means for such bearings.

An object of my invention is to provide a reliable, simple, inexpensive and easily manufactured oiling means for the bearings of an electric motor and the like.

Another object of my invention is to provide an oiling means that shall be particularly adaptable to motors which are to be selectively mounted in an upright or inverted position.

Another object of my invention is to provide a bearing-oiling means that shall be adapted to motors to be selectively mounted on a floor or on a ceiling without requiring any changes or reassembling of the motor parts incident to such selective location.

In practicing my invention, I utilize a motor-bearing housing having the usual shaft-receiving opening therein and having also an opening extending through the housing or bearing shell angularly, relatively to the axis of the shaft and communicating therewith intermediate its ends. A wick or similar lubricant-retaining means is located in the opening, which is closed at each end by a thin disc of soft material impervious to oil and by a resilient cover disc or cap of relatively hard material having an opening therethrough.

My invention may be better understood by reference to the accompanying drawing in which like figures of reference indicate like parts and in which, Fig. 1 is a side view, partly in elevation and partly in section, of a motor in which my lubricating device is incorporated.

Fig. 2 is an end elevational view of the motor shown in Fig. 1, and

Fig. 3 is an enlarged view, in cross-section, taken along the line III—III of Fig. 1.

My device may be applied to a bearing of any type in which a shaft is journaled in a sleeve bearing but is particularly applicable for use with an electric motor, such as the motor shown in Figs. 1 and 2.

Referring to Fig. 1, the motor shown comprises a base 11 and a frame 12 to which are attached end-bells or housings 13 and 14 which are drilled to provide openings 15 in which sleeve bearings 16 may be located. The shaft 18, on which the rotor (not shown) is mounted, is, in this case, provided with a fan 19 and is journaled in the sleeve bearings 16.

A cylindrical opening or oil well 21 is provided in each end bell to extend vertically thru an enlarged portion 20 of the bell at right angles to, and communicating with, the shaft opening 15.

A second sleeve 22 is provided with a flange 23 at its outer end to engage an enlarged portion 24 of the shaft. Oil-return grooves 25 extend in the bearing shell parallel to the shaft and are inclined in such manner that oil, which has been scraped from the shaft by the sleeve 22 is returned to the middle of the shaft opening and is there again picked up by the rotating shaft.

The sleeve 16 has an opening 10 through one wall adjacent to the oil well 21 and the oil well may be packed, in the usual manner, with oil, oil-soaked waste or the like, or it may be packed with longitudinally extending threads 9 of waste material, termed a "wick", which may be oil soaked. The oil-soaked packing is, therefore, in contact, intermediate its ends, with the shaft 18. The ends of the oil well are enlarged to provide a recess 33 for a disc 34 of soft material impervious to oil, such as paper, thin soft metal or the like which may be pressed into position, thus closing the seeds of the oil well.

A cap 35 of metal or other suitable material is provided in the form of a concave-convex disc which has an opening 36 through the center and may be tightly engaged in the oil-well recess by means of a suitably recessed tool (not shown) which may be utilized to drive down its edges to effect a locking engagement with the wall of the recess.

The oil well of the motor may be packed with packing material and saturated with oil during the manufacture thereof and shipped with both seals intact to the place where it is to be used. In this way, the manufacturer may be sure that the motor is not run without oil, since the motor is received by the user in condition for immediate use.

During shipment, the oil does not leak out because both ends of the oil well are sealed. The customer may install the motor in an upright or in an inverted position. When the customer wishes to oil the motor, he inserts a sharp tool through the opening in the uppermost concave-convex cap and pierces the inner seal. The upper seal only is punctured and, therefore, the oil well remains sealed at the lower end, thus preventing the dripping of oil therefrom.

The seal is protected from mechanical injury at all times by the metallic cap, and moisture and abrasive materials such as grit and dirt are prevented from entering the shaft opening, especially during shipment of the motor.

It is apparent that modifications may be made by those skilled in the art and such modifications may be made without departing from the spirit and scope of my invention, as set forth in the appended claims.

I claim as my invention:

1. In an oiling means for a shaft bearing comprising a bearing housing having a shaft opening therein, in combination, an opening extending through the housing and communicating with the shaft opening, an oil-retaining wick in said last named opening, means at each end of said last named opening for sealing it and other means for protecting the sealing means against mechanical injury.

2. In a lubricating means for a shaft bearing comprising a bearing housing for receiving a shaft, in combination, a lubricant-receiving opening extending through the housing, a lubricant-retaining wick in said opening, a mechanically-pierceable sealing means at each end of the opening, and a protecting cap at each end of the opening that is perforated to permit of piercing either seal for addition of oil.

3. In a bearing for the shaft of a motor adapted to be selectively mounted in an upright or inverted position, in combination, a bearing housing having an opening therethrough for receiving a shaft, a second opening extending through the housing angularly relatively to the shaft and communicating, intermediate its ends, with the shaft-receiving opening, a lubricant-retaining wick in said second opening, a seal of relatively soft material impervious to oil at each end of the second opening, and a protecting cap at each end of the second opening covering the seal and holding it in its proper operative position, the caps being perforated to permit of selectively piercing the seals for addition of oil.

4. In a lubricating means for a shaft bearing comprising a bearing housing having a shaft-receiving opening therein, in combination, a lubricant-receiving opening extending through the housing and, communicating, intermediate its ends, with the shaft receiving opening, a lubricant-retaining means in said second opening, a seal of relatively soft and thin material impervious to oil at each end of said second opening, and a protecting cap at each end of the second opening covering a seal and holding it in its proper operative position, each cap having an opening therethrough to permit of selectively piercing the seals for addition of oil.

5. In a bearing for the shaft of a motor adapted to be selectively mounted in an upright or inverted position, in combination, a bearing housing having an opening therethrough for receiving a shaft, a second opening extending through the housing angularly relatively to the shaft and communicating, intermediate its ends, with the shaft-receiving opening, a lubricant-retaining wick in said second opening, a disc of relatively thin and soft material impervious to oil at each end of said second opening, and a second disc of relatively hard and resilient material at each end of said second opening covering the first disc and holding it in its proper operative position, the second discs having an opening therethrough to permit of selectively piercing the disc thereunder.

6. In a lubricating means for a shaft bearing comprising a bearing housing having a shaft-receiving opening therein, in combination, a lubricant-receiving opening extending through the housing angularly relatively to the shaft-receiving opening and communicating therewith, intermediate its ends, oil-retaining means in the last named opening, a sealing disc of relatively soft and thin material impervious to oil located at each end of the lubricant-receiving opening, and a resilient disc of relatively hard material covering the sealing disc and holding it tightly in the second opening, each resilient disc having an opening therethrough to permit of selectively piercing a sealing disc.

7. In a lubricating means for a shaft bearing comprising a bearing housing having a shaft-receiving opening therein, in combination, a lubricant-receiving opening extending through the housing angularly relatively to the shaft-receiving opening, communicating therewith intermediate its ends and being enlarged at each end to form shoulders therein, a wick in the lubricant-receiving opening, a sealing disc of relatively soft and thin material impervious to oil located at each end of the lubricant-receiving opening and against a shoulder to seal the said opening at each end thereof, and a resilient disc of relatively hard material covering the sealing disc and pressing it against a shoulder, each resilient disc having an opening therethrough to permit of selectively piercing a sealing disc.

8. In a bearing for the shaft of a motor adapted to be selectively mounted in an upright or inverted position, in combination, a bearing housing having an opening therethrough for receiving a shaft, a second opening extending through the housing angularly relatively to the shaft and communicating, intermediate its ends, with the shaft-receiving opening, a lubricant-retaining wick in said second opening, a sealing disc of relatively soft and thin material, impervious to oil, located at each end of the second opening, a resilient disc of relatively hard material covering a sealing disc and holding it tightly in proper operative position in the second opening, each resilient disc having an opening therethrough to permit of piercing the uppermost sealing disc in accordance with the location of the motor.

In testimony whereof, I have hereunto subscribed my name this 31st day of December, 1928.

RALPH EHRENFELD.